US010894553B2

(12) United States Patent
Ceniza et al.

(10) Patent No.: US 10,894,553 B2
(45) Date of Patent: Jan. 19, 2021

(54) DOLLY TONGUE MANIPULATION MECHANISM

(71) Applicant: Toyota Motor Engineering & Manufacturing North America, Inc., Plano, TX (US)

(72) Inventors: Rommel B. Ceniza, Guelph (CA); Eddie Estanqueiro, Milton (CA)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 247 days.

(21) Appl. No.: 16/189,012

(22) Filed: Nov. 13, 2018

(65) Prior Publication Data

US 2020/0148244 A1 May 14, 2020

(51) Int. Cl.
*B62B 5/00* (2006.01)
*B62B 3/02* (2006.01)
*B60D 1/54* (2006.01)
*B60D 1/00* (2006.01)

(52) U.S. Cl.
CPC .............. *B62B 5/0079* (2013.01); *B60D 1/54* (2013.01); *B62B 3/02* (2013.01); *B60D 2001/001* (2013.01); *B60D 2001/544* (2013.01); *B62B 2205/003* (2013.01); *B62B 2206/006* (2013.01)

(58) Field of Classification Search
CPC ... B62B 5/0079; B62B 3/02; B62B 2205/003; B62B 2206/006; B60D 1/54; B60D 2001/544; B60D 2001/001
See application file for complete search history.

(56) References Cited

U.S. PATENT DOCUMENTS

| 5,277,446    | A    | * | 1/1994  | Hamel ................. B60D 1/38 280/477  |
| 6,065,621    | A    |   | 5/2000  | Fatemi et al.                              |
| 7,780,185    | B2   |   | 8/2010  | McConkey et al.                            |
| 7,976,052    | B1   | * | 7/2011  | Williams, Jr. .......... B60D 1/40 280/477 |
| 9,365,225    | B2   |   | 6/2016  | Henao                                      |
| 10,053,340   | B2   | * | 8/2018  | Albinger ............... B66C 23/821       |
| 2002/0117831 | A1   | * | 8/2002  | Ahlquist ................ B60D 1/36 280/477 |
| 2005/0220598 | A1   |   | 10/2005 | Shubert                                    |
| 2007/0040911 | A1   |   | 2/2007  | Riley                                      |
| 2007/0108731 | A1   | * | 5/2007  | McBroom ............... B60D 1/36 280/477 |
| 2017/0267299 | A1   |   | 9/2017  | Nielsen et al.                             |

* cited by examiner

*Primary Examiner* — Tony H Winner
*Assistant Examiner* — Michael R Stabley
(74) *Attorney, Agent, or Firm* — Christopher G. Darrow; Darrow Mustafa PC

(57) ABSTRACT

A transport dolly includes a base and a tongue rotatably mounted to the base. At least one support is mounted to the base. A first cable guide is coupled to the at least one support. A lever is rotatable between a first orientation and a second orientation. A cable has a first portion attached to the tongue. The cable extends from the tongue to the first cable guide, then to the lever. The lever pulls on the cable when the lever is rotated from the first orientation to the second orientation, so as to decrease a distance between the cable first portion and the first cable guide, thereby rotating the tongue from a lowered orientation to a raised orientation. A spring mechanism exerts a force on the lever to prevent rotation of the lever from the second orientation to the first orientation when the tongue is raised.

19 Claims, 3 Drawing Sheets

DOLLY TONGUE MANIPULATION MECHANISM

TECHNICAL FIELD

The present invention relates to transport dollies and, more particularly, to a mechanism for raising and lowering a tongue of a transport dolly to facilitate attachment of the dolly to a towing motor or vehicle.

BACKGROUND

With transport dollies, it is often necessary to attach the dolly to a tow motor or vehicle to pull the dolly to a desired location. The dolly may have a rotatable tongue configured to enable such attachment. To attach the dolly, it may be necessary for a user to first lift the tongue from the floor. Similarly, in detaching the tongue from a tow motor or vehicle, the tongue may need to be lowered to the floor. The need to repeatedly bend over and manually lift and lower the tongue may be wearing and injurious to the user.

SUMMARY

In one aspect of the embodiments described herein, a transport dolly includes a base and a tongue rotatably mounted to the base. At least one support is mounted to the base. A first cable guide is coupled to the at least one support. A lever is rotatably coupled to the at least one support at a pivot, so as to be rotatable between at least a first orientation and a second orientation. A cable having a first portion is attached to the tongue. The cable extends from the tongue to the first cable guide, then from the first cable guide to the lever. The cable is operatively coupled to the lever such that the lever pulls on the cable when the lever is rotated from the first orientation to the second orientation, so as to decrease a distance between the cable first portion and the first cable guide, thereby rotating the tongue from a lowered orientation to a raised orientation. A spring mechanism is also coupled to the lever and is configured to exert a force on the lever sufficient to prevent rotation of the lever from the second orientation to the first orientation due to a weight force of the tongue exerted on the cable when the lever is in the second orientation and the tongue is raised.

In another aspect of the embodiments described herein, a tongue positioning mechanism for a transport dolly is provided. The mechanism includes at least one support configured to be securable to a dolly, and a first cable guide coupled to the at least one support. A lever is rotatably coupled to the at least one support at a pivot so as to be rotatable between at least a first orientation and a second orientation. The mechanism also includes a cable having a first portion configured to be attachable to a tongue of a dolly. The cable is configured to extend between the tongue and the first cable guide when the cable first portion is attached to the tongue. The cable also extends from the first cable guide to the lever. The cable is operatively coupled to the lever such that the lever pulls on the cable when the lever is rotated from the first orientation to the second orientation, so as to decrease a distance between the cable first portion and the first cable guide. A spring mechanism is also coupled to the lever. The spring mechanism is configured to exert a force on the lever which resists rotation of the lever from the second orientation to the first orientation.

DETAILED DESCRIPTION

Embodiments described herein relate to a mechanism for lifting and lowering a tongue of a transport dolly, without the need for a user to bend over and manually raise or lower the tongue. A lever is connected to the tongue by a cable-and-pulley arrangement. Operation of the lever by a user acts to raise and lower the dolly tongue via the cable. The mechanism may also be configured as a separate, self-contained module which may be attached as a unit to a dolly and connected to a tongue of the dolly to raise and lower the tongue as described herein.

Figure 1:
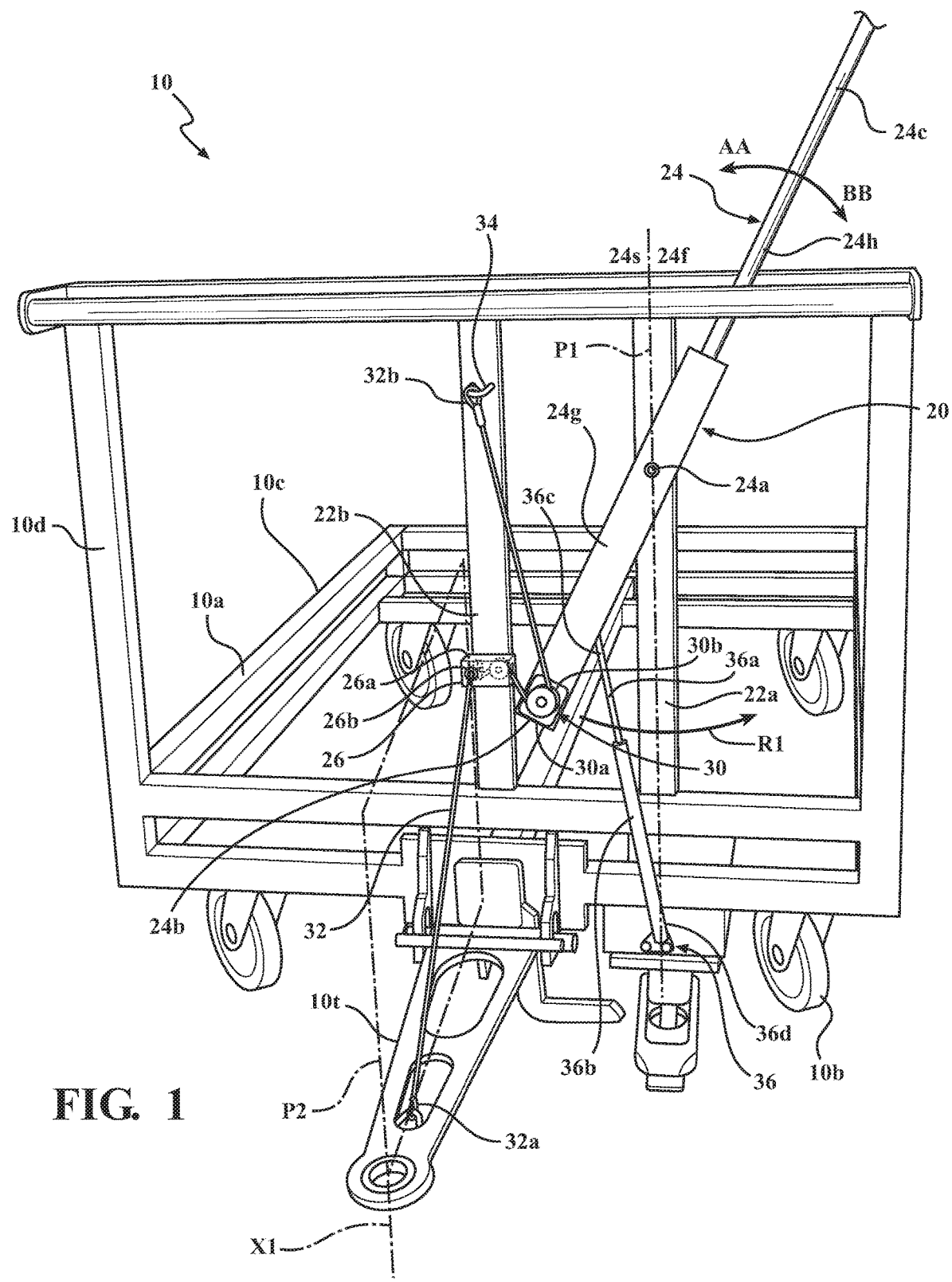
FIG. 1 is a schematic perspective view of an embodiment of a tongue positioning mechanism in a first configuration, with a tongue of a dolly in a lowered orientation.

FIG. 1 is a schematic perspective view of a transport dolly 10 incorporating one embodiment of a dolly tongue positioning mechanism. Dolly 10 may be used for transporting any of a variety of bulky and/or heavy items between locations in a manufacturing environment, for example. Dolly 10 may include a base 10a and wheels 10b. supporting the base and facilitating movement of the dolly. Base 10a may define a loading area 10c onto which various types of loads may be loaded for transport. A supporting frame 10d may extend vertically from a front portion of the base 10a to aid in supporting a load on the loading area 10c or to enable a portion of a load to be leaned against the frame 10d. The supporting frame 10d may also facilitate manual gripping and pulling of the dolly 10. A tongue 10t may be rotatably attached to a front portion of the base 10a at a tongue support region 10s. Tongue 10t may enable the dolly 10 to be secured to a vehicle or towing motor (not shown) and towed between locations. Tongue 10t may be manually rotatable between a lowered orientation (shown in FIG. 1) and a raised orientation (shown in FIG. 2). In the lowered orientation, the tongue 10t may rest on a floor or other support surface. In the raised orientation, the tongue 10t may extend vertically or near vertically from the tongue support region 10s and may be configured to reside in this orientation until rotated by a user. As known in the pertinent art, the dolly base 10a, frame 10d, and tongue 10t may be formed from any suitable materials (steel, for example) using any suitable methods.

Figure 2:
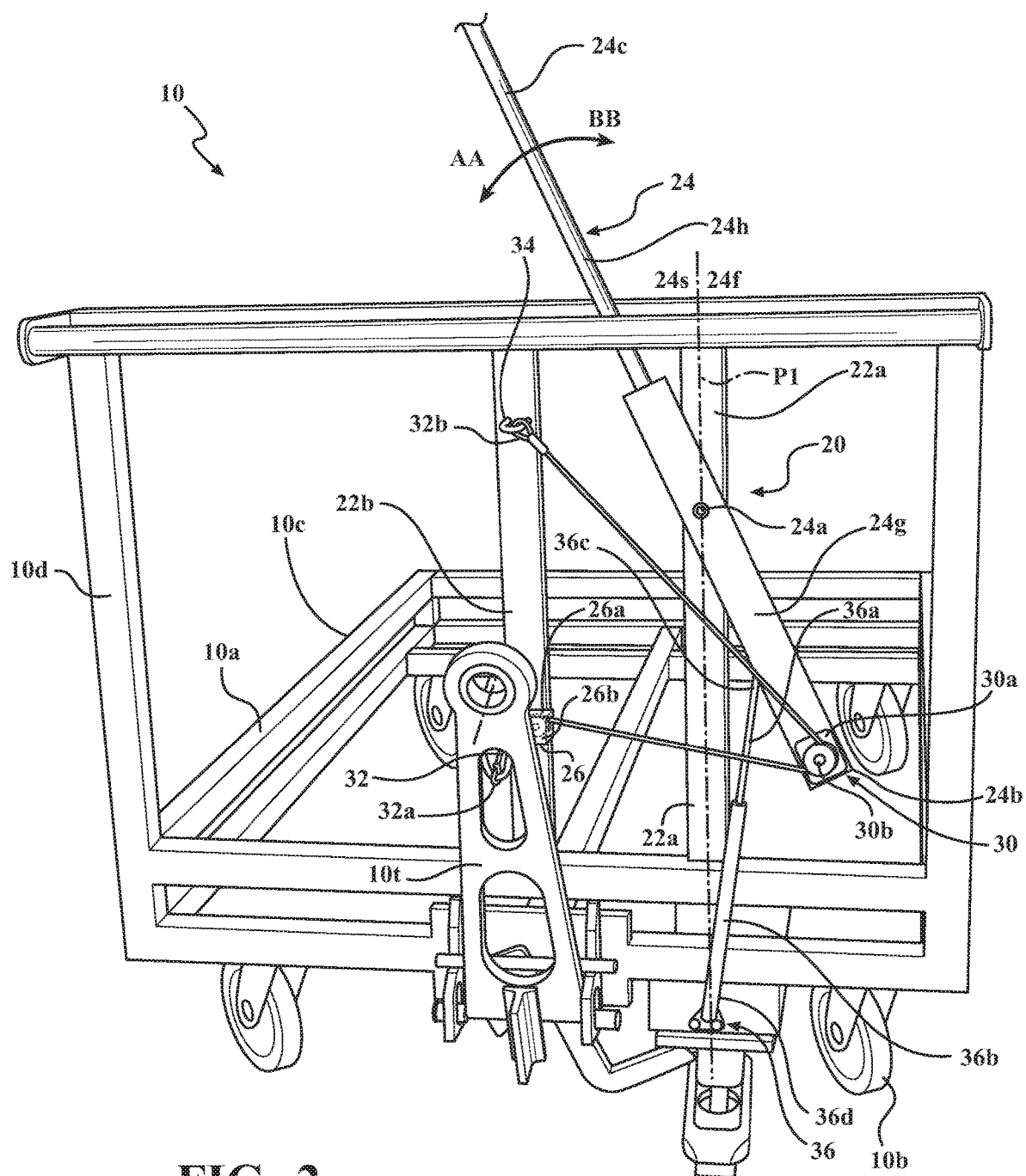
FIG. 2 is a schematic perspective view of the tongue positioning mechanism of FIG. 1 in a second configuration, with the dolly tongue in a raised orientation.

Referring to FIGS. 1 and 2, the dolly 10 may incorporate an embodiment of a tongue positioning mechanism, generally designated 20. The tongue positioning mechanism 20 may include at least one support 22 mounted to the base 10a and/or supporting frame 10d. The embodiment shown includes a pair of spaced apart supports, first support 22a and second support 22b, attached to supporting frame 10d and extending vertically from base 10a. However, other configurations of support(s) may also be used as long as they are suitable for the purposes described herein. For example, a single support may be attached to the dolly and used to support all of the elements of the tongue positioning mechanism as described herein. In one or more arrangements, the single support may be in the form of a steel plate configured to be attachable to the dolly.

The support(s) 22 are structured to support the other elements of the tongue positioning mechanism 20, to enable these elements to be mounted on the dolly 10. Support(s) 22 may be formed from any suitable materials and may be attached to supporting frame 10d and/or to base 10a using any suitable method(s) (for example, welding). In particular embodiments, portions of the dolly supporting frame 10d may be used as supports for coupling the other elements of the tongue positioning mechanism to the dolly. In such cases, dedicated, separate supports (such as supports 22a and 22b) may be eliminated.

Referring to FIGS. 1 and 2, a lever 24 may be rotatably coupled to the at least one support 22 at a pivot 24a so as to be rotatable between at least a first orientation (shown in FIG. 1) and a second orientation (shown in FIG. 2). "Rotatably coupled" means that the lever is coupled to the at least one support so as to be rotatable with respect to the at least one support. In the embodiment shown, lever 24 is attached to first support 22a. Lever 24 may have a first end 24b and a second end 24c opposite the first end. Second end 24c may be grasped and pulled in directions AA and BB by a user to rotate the lever. Lever 24 may also have a first side 24g extending from the pivot 24a to the lever first end 24b. Lever may also have a second side 24h extending from the pivot 24a to the lever second end 24c.

As shown in FIGS. 1 and 2, and in the manner described herein, lever 24 may be manually rotated from the first orientation to the second orientation to raise the tongue 10t from the lowered orientation to the raised orientation. Also, lever 24 may be rotated from the second orientation to the first orientation to lower the tongue 10t from the raised orientation to the lowered orientation. In the first orientation of the lever 24, the lever second end 24c may reside on a first side 24f of a vertical plane P1 extending through the pivot 24a. In the second orientation of the lever 24, the lever second end 24c may reside on a second side 24s of the vertical plane P1 extending through the pivot 24a.

In one or more embodiments, the lever 24 may be detachably coupled to the at least one support. This enables any of a variety of levers having various configurations to be used, according to the requirements of a particular application. For example, a lever having a relatively greater or shorter length may be used as needed to fit onto a particular dolly design, and to perform the functions described herein.

A first cable guide 26 may be coupled to the at least one support. In the embodiment shown, first cable guide 26 is coupled to second support 22b. The first cable guide 26 may be configured and positioned to direct the forces transmitted by the cable 32 (described in greater detail below), and to position application points of the forces in desired locations. The first cable guide 26 may also be structured to confine a portion of the cable 32 in contact with the cable guide, to prevent this portion of the cable from becoming detached from the tongue positioning mechanism. The first cable guide 26 may be attached to the support 22b such that the portion of the cable 32 extending between the tongue 10t and the first cable guide extends along (or substantially parallel to) a vertical plane P2 extending through a plane P2 including a longitudinal central axis X1 of the tongue 10t. This alignment may help ensure the most efficient transfer of the lifting force from the cable to the tongue.

In one or more arrangements, the first cable guide 26 may include a mounting bracket 26a with one or more pulleys 26b rotatably secured thereto. Cable 32 may slide along the pulley(s) 26b during operation of the tongue positioning mechanism. In one or more arrangements, mountings of the pulley(s) 26b to the mounting bracket 26a may be configured to rotate with respect to the mounting bracket 26a and with respect to the support 22b, to allow the pulley(s) 26b to rotate responsive to changes in the directions in which the cable enters and exits the first cable guide 26, thereby further reducing friction between the cable and the cable guide.

The first cable guide 26 may be attached to the support 22b at a fixed (i.e., non-movable) location along the length of the support. Alternatively, in one or more arrangements, the first cable guide 26 and an associated support (such as support 22b) may be configured so that a location where the first cable guide 26 is coupled to the support is adjustable along the support. In particular embodiments, the first cable guide 26 may be adjustably attached to the support 22b so as to be positionable at any desired location along the support. For example, the mounting bracket may 26a be configured to be slidable or otherwise movable along the support 22b and securable at a desired location along the support using a set screw or other suitable securement mechanism.

In another example, with a support in the form of a single, common support plate or member (not shown) to which both the lever 24 and the first cable guide 26 may be attached, a vertical slot may be formed in the support plate and the first cable guide 26 may be movable and securable at locations along the slot. This positionability of the lever and first cable guide 26 allows the overall configuration of the tongue positioning mechanism to be adjusted or tailored to the geometry of a particular dolly, and to other aspects of a particular application. This positionability allows enables the forces acting on the various elements of the tongue positioning mechanism to be adjusted or "tuned" to a certain degree as desired.

A second cable guide 30 may be coupled to the lever 24 at a location along the first side 24g of the lever 24 so as to rotate with the lever. The second cable guide 30 may be configured and positioned to direct the forces transmitted by the cable 32, and to position application points of the forces in desired locations. The second cable guide 30 may also be structured to confine a portion of the cable 32 in contact with the second cable guide, to prevent this portion of the cable from becoming detached from the tongue positioning mechanism.

The second cable guide 30 may be attached to the lever 24 at a fixed (i.e., non-movable) location along the length of the lever. Alternatively, in one or more arrangements, the second cable guide 30 and the lever 24 may be configured so that a location where the second cable guide 30 is coupled to the lever is adjustable along the lever to any desired location between the pivot 24a and the lever first end 24b. For example, the second cable guide 30 may incorporate a bracket 30a on which a second pulley 30b is mounted, and which is slidable or otherwise movable along the lever 24 and securable at a desired location along the lever (for example, using a set screw or other suitable securement mechanism). As stated previously, this positionability allows the overall configuration of the tongue positioning mechanism to be adjusted or tailored to the geometry of a particular dolly, and to other aspects of a particular application. This positionability allows enables the forces acting on the various elements of the tongue positioning mechanism to be adjusted or "tuned" to a certain degree as desired.

In particular embodiments, the second cable guide 30 may be omitted and an end of the cable 32 may be affixed to the lever 24 so as to be non-movable with respect to the lever (i.e., and end or portion of the cable may be anchored to the lever so that the length of the portion of the cable extending between the tongue and the second cable guide 30 does not change during operation of the tongue positioning mechanism.

Cable 32 may have a first end 32a and a second end 32b opposite the first end. Cable 32 may have a first portion (for example first end 32a) attached to the tongue 10t. The cable 32 may extend from the tongue 10t to the first cable guide 26, then from the first cable guide 26 to the lever 24. The cable 32 may be operatively coupled to the lever 24 such that the lever 24 pulls on the cable 32 when the lever 24 is rotated from the first orientation to the second orientation, so as to decrease a distance between the cable first portion attached to the tongue 10t and the first cable guide 26, thereby rotating the tongue 10t from a lowered orientation to a raised orientation.

In one or more arrangements, the cable 32 is coupled to the lever 24 by the second cable guide 30 (previously described) attached to the lever 24. The cable 32 may wrap around the second cable guide 30 and then extend from the second cable guide 30 to an attachment location or anchor 34 of the cable to which the first cable guide is attached. In the embodiment shown, the attachment location 34 is located on second support 22b. The cable 32 may be attached to the attachment location 34 at the second end 32b of the cable or at another location along the cable. The cable 32 may be welded or otherwise attached at the attachment location 34 so that the attached portion of the cable does not slide or move with respect to the element to which it is attached (i.e., the cable is anchored at this location).

In particular arrangements, the cable attachment location 34 may be on the lever 24 (i.e., the cable 32 may be welded or otherwise attached directly to the lever 24 so that the attached portion of the cable does not slide or move with respect to the lever). In particular arrangements, the attachment location 34 may be a location separate from any of the tongue positioning mechanism supports (for example, a location on a dolly to which the tongue positioning mechanism is attached). Extending the length of the cable 32 from the second cable guide 30 to an attachment location 34 and enabling the cable to slide or move with respect to the lever 24 instead of anchoring the cable 32 at the lever 24 may reduce the force required to lift the tongue 10t by rotating the lever 24, and may also increase the stroke of the lever (i.e., the amount by which the lever 24 must be rotated to lift the tongue 10t a given distance from the floor).

A spring mechanism 36 may be coupled to the lever 24 and configured to exert a force on the lever sufficient to prevent rotation of the lever from the second orientation to the first orientation due to a weight force of the tongue 10t exerted on the cable 32 when the lever 24 is in the second orientation and the tongue 10t is raised. The spring mechanism 36 may be coupled to the lever 24 at a location along the first side 24g of the lever. In one or more arrangements, the spring mechanism 36 is coupled to the lever 24 at a location between the pivot 24a and the second cable guide 30. In an alternative embodiment, the spring mechanism 36 may be attached to the lever 24 at a location between the second cable guide 30 and the lever first end 24b. In another alternative embodiment, the spring mechanism 36 may be attached to the lever 24 at the same location at which the second cable guide 30 is attached to the lever.

In the embodiment shown in FIGS. 1-2, the spring mechanism 36 is in the form of a resiliently axially-compressible telescoping cylinder or shock absorber having a shaft 36a which is resiliently axially retractable into a housing 36b responsive to a compressible axial load applied to an end of the shaft. Other forms of spring mechanisms may also be used provided they function as described herein. "Axially-compressible" means that the spring mechanism (such as a telescoping cylinder or a coil spring member) may be shortened along a longitudinal axis of the spring mechanism by rotation of the lever.

In the embodiment shown, a first end 36c of the cylinder is rotatably attached to the lever 24 at a location along the first side 24g of the lever. A second end 36d of the cylinder is shown rotatably attached to the dolly. However, the second end 36d of the cylinder may alternatively be rotatably attached to one of the tongue positioning mechanism supports. In one or more arrangements, an attachment location of the cylinder second end may be coplanar with pivot 24a, for example, along a plane such as plane P1.

In one or more arrangements, the spring mechanism 36 and the lever 24 are configured so that a location where the spring mechanism is coupled to the lever is adjustable along a length of the lever. As stated previously, this positionability allows the overall configuration of the tongue positioning mechanism to be adjusted or tailored to the geometry of a particular dolly, and to other aspects of a particular application. This positionability allows enables the forces acting on the various elements of the tongue positioning mechanism to be adjusted or "tuned" to a certain degree as desired.

Operation of an embodiment of the tongue positioning mechanism will now be described with reference to FIGS. 1-2.

FIG. 1 shows an embodiment of the tongue positioning mechanism in a first configuration, with the tongue 10t in a lowered orientation. In this configuration, lever second end 24c resides along a first side 24f of the plane P1. FIG. 2 shows an embodiment of the tongue positioning mechanism in a second configuration, with the tongue 10t in a raised orientation. To bring the tongue from the lowered orientation to a raised orientation, a force is applied to lever second end 24c to rotate the lever in the direction indicated by arrow AA. Lever 24 then pivots about pivot 24a, moving second cable guide 30 in direction R1 and tensioning the cable 32. As the cable 32 is anchored at attachment location 34, movement of the lever first end 24b and second cable guide 30 pulls of the portion of the cable attached to the tongue 10t, forcing the tongue to rise. At the same time, movement of the lever first end 24b forces the end of cylinder shaft 36a attached to the lever 24 to resiliently retract into the cylinder housing 36b, thereby causing the cylinder to exert a reaction force on the lever 24 opposing the cylinder compression.

As lever rotation continues, compression of the cylinder 36 continues and the spring force exerted on the lever 24 increases until the location at which the cylinder 36 is attached to the lever 24 reaches its point of closest approach to the location at which the opposite end of the cylinder is attached (to the dolly or tongue positioning mechanism support). As rotation of the lever 24 continues past this point, the spring force exerted on the lever 24 gradually decreases until the lever 24 is at the end of its rotation stroke and the tongue 10t is in the raised orientation shown in FIG. 2, with the lever second end 24c residing along a second side 24s of the plane P1.

In the manner just described, force exerted by the cylinder 36 on the lever 24 acts to oppose the first part of any motion of the lever 24 from the first orientation to the second orientation or from the second orientation to the first orientation. Due to the constant force exerted by the cylinder 36 on the lever 24 as the cylinder is being compressed and decompressed during rotation of the lever 24, the cylinder effectively acts to absorb and dampen impulse or shock loads applied to the lever 24, and generally "smoothes out" the rotational motion of the lever 24.

The cylinder 36 (or any other spring mechanism employed) is configured so as to exert sufficient force on the lever to prevent rotation of the lever 24 due to the weight of the tongue 10t when the tongue is in the raised orientation. Thus, the tongue 10t is maintained in the raised orientation by action of the spring mechanism 36. To lower the tongue 10t, a reverse procedure may be applied, by rotating the lever 24 in direction BB.

Figure 3:
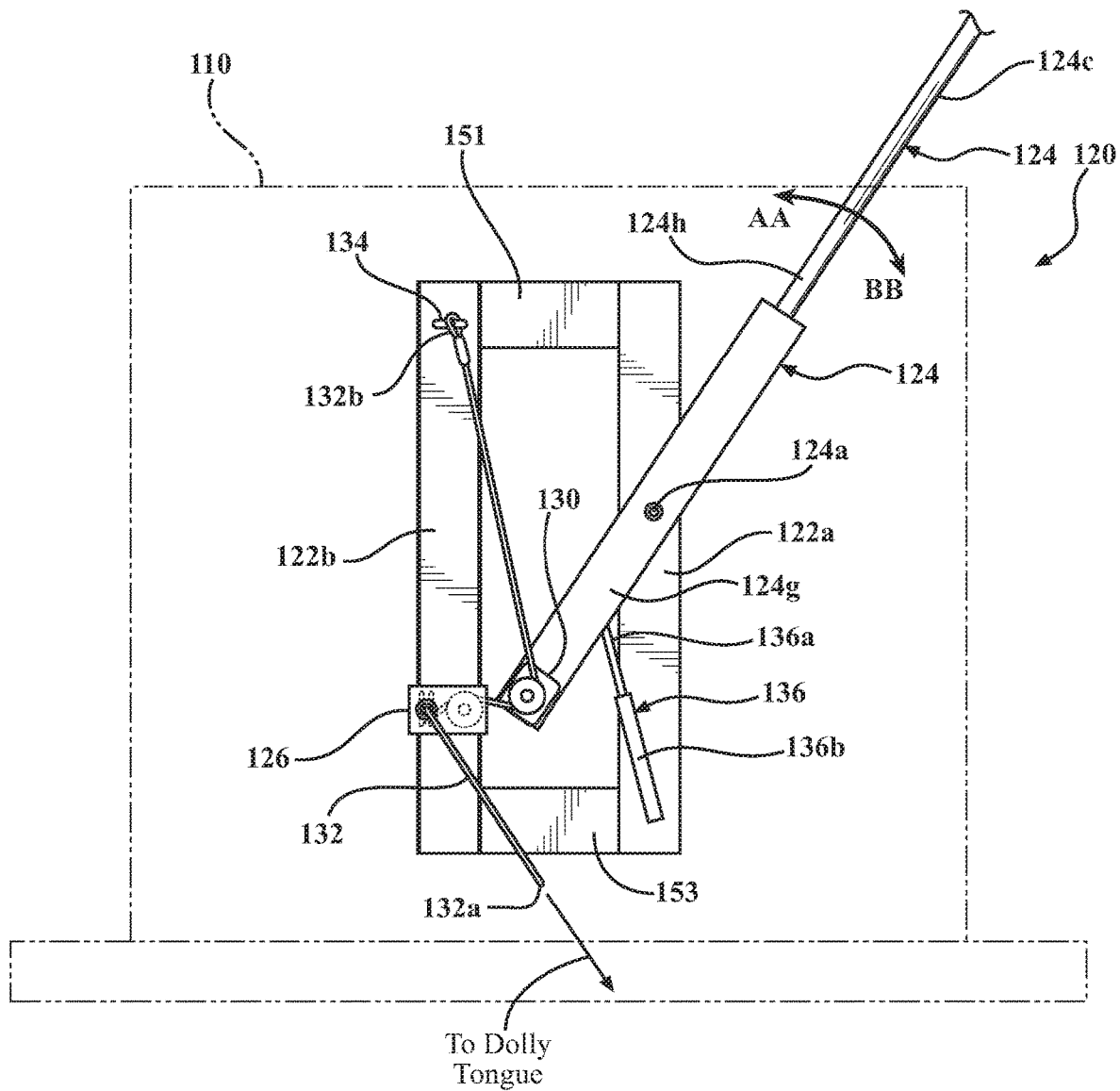
FIG. 3 is a schematic view of an embodiment of a tongue positioning mechanism in the form of a separate sub-assembly which may be attached to an existing dolly and connected to a dolly tongue.

FIG. 3 shows an embodiment of a tongue positioning mechanism 120 in the form of a separate sub-assembly which may be attached to an existing dolly and connected to the dolly tongue, so as to be operable to raise and lower the tongue in the manner just described. Tongue positioning mechanism 120 is shown in FIG. 3 schematically attached to a dolly 110. Elements of the sub-assembly 120 common to the embodiment shown in FIGS. 1 and 2 have similar reference numerals and function as described with regard to the embodiment shown in FIGS. 1 and 2. In addition to tongue positioning mechanism elements similar to those shown in FIGS. 1 and 2, the tongue positioning mechanism sub-assembly 120 may include one or more cross-members 151, 153 connecting tongue positioning mechanism supports 122a and 122b. The cross-members 151, 153 may secure the supports in desired positions with respect to each other to enable the tongue positioning mechanism elements to be handled and attached to a dolly as a single unit.

In one or more arrangements, the cross-members 151, 153 may be rigidly connected to the supports 122a, 122b to provide a single, constant spacing between the supports. In other arrangements, the cross-members 151, 153 and supports 122a, 122b may be configured to enable a spacing between the supports 122a, 122b to be adjusted according to the requirements of a particular application. This enables the tongue positioning mechanism configuration to be further adjusted to meet the needs of a particular application.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A dolly comprising:
   a base;
   a tongue rotatably mounted to the base;
   at least one support mounted to the base;
   a first cable guide coupled to the at least one support;
   a lever rotatably coupled to the at least one support at a pivot, so as to be rotatable between at least a first orientation and a second orientation;
   a cable having a first portion attached to the tongue, the cable extending from the tongue to the first cable guide, then from the first cable guide to the lever, the cable being operatively coupled to the lever such that the lever pulls on the cable when the lever is rotated from the first orientation to the second orientation, so as to decrease a distance between the cable first portion and the first cable guide, thereby rotating the tongue from a lowered orientation to a raised orientation; and
   a spring mechanism coupled to the lever and configured to exert a force on the lever sufficient to prevent rotation of the lever from the second orientation to the first orientation due to a weight force of the tongue exerted on the cable when the lever is in the second orientation and the tongue is raised.

2. The dolly of claim 1 wherein the lever has a first end and a second end opposite the first end, and wherein the spring mechanism is coupled to the lever at a location along a first side of the lever extending from the pivot to the lever first end.

3. The dolly of claim 2 further comprising a second cable guide coupled to the lever at a location along the first side of the lever so as to rotate with the lever, wherein the cable extends between the first cable guide and the second cable guide, and wherein the cable also extends between the second cable guide and an attachment location of the cable to the at least one support.

4. The dolly of claim 3 wherein the spring mechanism is coupled to the lever at a location between the pivot and the second cable guide.

5. The dolly of claim 3 wherein the second cable guide and the lever are configured so that a location where the second cable guide is coupled to the lever is adjustable along a length of the lever.

6. The dolly of claim 1 wherein the spring mechanism comprises a resiliently axially-compressible shock absorber having a first end rotatably coupled to the lever and a second end rotatably coupled to the at least one support.

7. The dolly of claim 1 wherein the spring mechanism and the lever are configured so that a location where the spring mechanism is coupled to the lever is adjustable along a length of the lever.

8. The dolly of claim 1 wherein the first cable guide and the at least one support are configured so that a location where the first cable guide is coupled to the at least one support is adjustable along the at least one support.

9. The dolly of claim 1 wherein the lever is detachably coupled to the at least one support.

10. A tongue positioning mechanism for a transport dolly, the mechanism comprising:
    at least one support configured to be securable to a dolly;
    a first cable guide coupled to the at least one support;
    a lever rotatably coupled to the at least one support at a pivot so as to be rotatable between at least a first orientation and a second orientation;
    a cable having a first portion configured to be attachable to a tongue of a dolly, the cable being configured to extend between the tongue and the first cable guide when the cable first portion is attached to the tongue, the cable also extending from the first cable guide to the lever, the cable being operatively coupled to the lever such that the lever pulls on the cable when the lever is rotated from the first orientation to the second orientation, so as to decrease a distance between the cable first portion and the first cable guide; and a spring mechanism coupled to the lever, the spring mechanism being configured to exert a force on the lever which resists rotation of the lever from the second orientation to the first orientation.

11. The tongue positioning mechanism of claim 10 wherein the lever has a first end and a second end opposite the first end, and wherein the spring mechanism is coupled to the lever at a location along a first side of the lever extending from the pivot to the first end of the lever.

12. The tongue positioning mechanism of claim 11 further comprising a second cable guide coupled to the lever at a location along the first side of the lever so as to rotate with the lever, wherein the cable extends between the first cable guide and the second cable guide, and wherein the cable also extends between the second cable guide and an attachment location of the cable to the at least one support.

13. The tongue positioning mechanism of claim 12 wherein the spring mechanism is coupled to the lever at a location between the pivot and the second cable guide.

14. The tongue positioning mechanism of claim 12 wherein the second cable guide and the lever are configured so that a location where the second cable guide is coupled to the lever is adjustable along a length of the lever.

15. The tongue positioning mechanism of claim 10 wherein the spring mechanism comprises a resiliently axially-compressible shock absorber having a first end rotatably coupled to the lever and a second end rotatably coupled to the at least one support.

16. The tongue positioning mechanism of claim 10 wherein the spring mechanism and the lever are configured so that a location where the spring mechanism is coupled to the lever is adjustable along a length of the lever.

17. The tongue positioning mechanism of claim 10 wherein the first cable guide and the at least one support are configured so that a location where the first cable guide is coupled to the at least one support is adjustable along the at least one support.

18. The tongue positioning mechanism of claim 10 wherein the lever is detachably coupled to the at least one support.

19. The tongue positioning mechanism of claim 10 wherein the spring mechanism is also configured to resist rotation of the lever from the first orientation to the second orientation.

* * * * *